United States Patent
Dibowski et al.

(10) Patent No.: US 10,216,160 B2
(45) Date of Patent: Feb. 26, 2019

(54) MATCHING A BUILDING AUTOMATION ALGORITHM TO A BUILDING AUTOMATION SYSTEM

(71) Applicant: Honeywell International Inc., Morristown, NJ (US)

(72) Inventors: Henrik Dibowski, Leipzig (DE); Ondrej Holub, Prague (CZ); Jiri Rojicek, Prague (CZ)

(73) Assignee: Honeywell International Inc., Morris Plains, NJ (US)

( * ) Notice: Subject to any disclaimer, the term of this patent is extended or adjusted under 35 U.S.C. 154(b) by 300 days.

(21) Appl. No.: 15/134,787

(22) Filed: Apr. 21, 2016

(65) Prior Publication Data

US 2017/0308045 A1    Oct. 26, 2017

(51) Int. Cl.

| | | |
|---|---|---|
| G01M 1/38 | (2006.01) |
| G05B 13/00 | (2006.01) |
| G05B 15/00 | (2006.01) |
| G05B 23/00 | (2006.01) |
| G05B 19/042 | (2006.01) |
| G05B 15/02 | (2006.01) |

(52) U.S. Cl.
CPC ........... G05B 19/042 (2013.01); G05B 15/02 (2013.01); *G05B 2219/2642* (2013.01)

(58) Field of Classification Search
CPC ................................ G05B 11/01; G05B 17/02
USPC ........................................................ 700/275
See application file for complete search history.

(56) References Cited

U.S. PATENT DOCUMENTS

| | | | |
|---|---|---|---|
| 2011/0055748 A1* | 3/2011 | Vacariuc | G05B 15/02 715/771 |
| 2011/0071685 A1* | 3/2011 | Huneycutt | G05B 15/02 700/275 |
| 2011/0093424 A1 | 4/2011 | Zimmermann et al. | |
| 2012/0259466 A1* | 10/2012 | Ray | G05B 15/02 700/275 |
| 2014/0324386 A1 | 10/2014 | Spivey et al. | |
| 2014/0325291 A1* | 10/2014 | Spivey | G05B 15/02 714/48 |

(Continued)

OTHER PUBLICATIONS

Li, et al: "Decoupling features and virtual sensors for diagnosis of faults in vapor compression air conditioners", International Journal of Refrigeration dated Feb. 22, 2007, pp. 546-564, vol. 30, No. 3, Elsevier, Paris, FR.

(Continued)

*Primary Examiner* — Mohammad Ali
*Assistant Examiner* — Md Azad
(74) *Attorney, Agent, or Firm* — Honeywell International Inc.

(57) ABSTRACT

Methods, devices, and systems for matching a building automation algorithm to a building automation system are described herein. One device includes a memory, and a processor configured to execute executable instructions stored in the memory to select a building automation algorithm from a pre-defined library of building automation algorithms, determine whether the selected building automation algorithm matches a building information model associated with the building automation system, and output, upon the selected building automation algorithm matching the building information model, the selected algorithm.

14 Claims, 4 Drawing Sheets

(56) References Cited

U.S. PATENT DOCUMENTS

2015/0241856 A1* 8/2015 Walser .................... F24F 11/30
                                                                700/275
2018/0046173 A1* 2/2018 Ahmed .................... F24F 11/30

OTHER PUBLICATIONS

Extended search report pursuant to Rule 62 EPC from related European Patent Application No. 17165166.4 dated Sep. 5, 2017 (9 pages).

* cited by examiner

MATCHING A BUILDING AUTOMATION ALGORITHM TO A BUILDING AUTOMATION SYSTEM

TECHNICAL FIELD

The present disclosure relates to methods, devices, and systems for matching a building automation algorithm to a building automation system.

BACKGROUND

Building automation systems can be complex distributed systems. For example, a building automation system can include many different pieces of equipment. As a specific example, a building automation system can include different pieces of heating, ventilation, and air-conditioning (HVAC) equipment as well as other equipment such as sensors, operating panels, controllers, actuators, etc.

Detecting faults within a building automation system to maintain functionality of the building automation system can be important to provide a comfortable environment for occupants of an area (e.g., a room or a zone) of a building serviced by the building automation system, to prevent the building automation from further damage resulting from a detected fault, and/or to avoid inefficient operation of the building automation system which may result in higher energy consumption. For example, occupant comfort in a building serviced by a building automation system can be a direct result of the functionality of the building automation system, and occupant comfort may be quickly lost in the event a component of the building automation system, such as the equipment, fails.

Fault detection and diagnosis can help quickly determine faults of equipment and/or faults in control strategies in a building by using available system variables of a building automation system. System variables of a building automation system can include data from various types of physical sensors, data from control sequences, and/or data from other system variables (e.g., signals from controllers, actuators, and/or meters, etc.) For example, fault detection and diagnosis can help a user of the building automation system, such as an engineer, building manager, or other service personnel, and/or a system (e.g., a building automation system) to quickly detect faults, gain understanding of a current state of building operation, and/or schedule repairs of faults in a building automation system.

DETAILED DESCRIPTION

Figure 1:
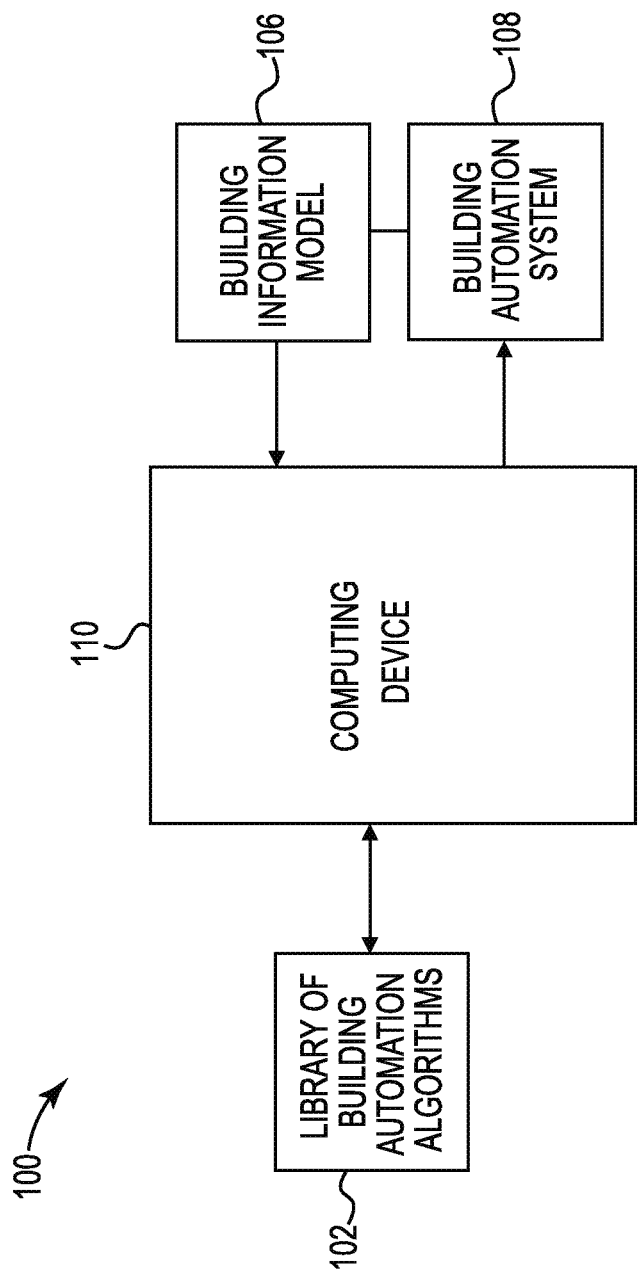
FIG. 1 is an example system for matching a building automation algorithm to a building automation system, in accordance with one or more embodiments of the present disclosure.

Methods, devices, and systems for matching a building automation algorithm to a building automation system are described herein. For example, one or more embodiments include a memory, and a processor configured to execute executable instructions stored in the memory to select a building automation algorithm from a pre-defined library of building automation algorithms, determine whether the selected building automation algorithm matches a building information model associated with the building automation system, and output, upon the selected building automation algorithm matching the building information model, the selected algorithm.

Fault detection and diagnosis can help a user and/or a system (e.g., a building automation system) identify a fault that has occurred in a building automation system by using various data from the building automation system servicing a building. For example, a fault in a piece of HVAC equipment can be determined by examining data of various system variables collected by various sensors and/or other system variables including signals from controllers, actuators, and/or meters included in a building serviced by the building automation system. Once a fault is determined, the fault can be serviced (e.g., repaired) by an engineer, building manager, or other service personnel.

Fault detection and diagnosis can depend on data taken from sensors included in the building. However, the number of sensors available to collect data may be limited. For example, certain measurements of variables associated with equipment of a building automation system, and/or certain measurements relating to areas (e.g., rooms or zones) in the building may not be technically measurable, or may be measurable but at a high monetary cost. Additionally, cost restrictions may limit the number of physical sensors available to collect data. A limited number of physical sensors may result in a limited amount of collectable measurements of variables associated with equipment of the building automation system and/or areas of the building.

Additionally, most buildings are unique and may not have similar building automation systems. For instance, an office building may have a building automation system that differs from a warehouse, which may have a different building automation system. The differences in the two building automation systems may result from different building layouts, different types of equipment, different configurations, different types of available sensors, etc.

Setting up fault detection and diagnosis for each individual building automation system can be a time consuming, expensive, and complex process. Additionally, the usefulness of the fault detection and diagnosis may be limited due to a limitation in measurable data from a number of available sensors present in a building automation system.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing.

As used herein, "a" or "a number of" something can refer to one or more such things. For example, "a number of algorithms" can refer to one or more algorithms.

FIG. 1 is a system for matching a building automation algorithm to a building automation system, in accordance with one or more embodiments of the present disclosure. As shown in FIG. 1, the system 100 can include a library of building automation algorithms 102, building information model 106, building automation system 108, and computing device 110.

Computing device 110 can select a building automation algorithm from a library of building automation algorithms 102. As used herein, a building automation algorithm can include instructions that, when executed by a computing device, perform a task related to building fault analytics, monitoring, diagnostics, and control. For example, a building automation algorithm can include fault detection and diagnosis algorithms and/or virtual sensor algorithms, as will be further described herein.

As used herein, a building automation system refers to a system of equipment that can include central equipment and decentralized equipment. In some examples, the central equipment can include different plants such as boilers, chillers, air handling units (AHU's), rooftop units (RTU's), variable air volume (VAV) systems and control devices, and/or heat pumps, etc. In some examples, the decentralized equipment can include sensors, operating panels, controllers, actuators, fans, pumps, valves, coils, and/or radiators, etc.

Although sensors, operating panels, controllers, actuators, fans, pumps, valves, and/or radiators are described as being decentralized equipment, embodiments of the disclosure are not so limited. For example, sensors, operating panels, controllers, actuators, fans, pumps, valves, and/or radiators can be a part of and/or components of central equipment.

The library of building automation algorithms 102 can be pre-defined. For example, library of building automation algorithms 102 can include a number of pre-defined algorithms for fault detection and diagnosis (FDD) and/or for virtual sensors (VS). In some instances, library of building automation algorithms 102 can include a number of pre-defined algorithms for FDD that are specialized for certain types of equipment (e.g., fault detection and diagnosis algorithms for different types of boilers, chillers, AHU's, RTU's, VAV systems, heat pumps, etc.), or specialized for areas of a building serviced by building automation system 108. In some instances, library of building automation algorithms 102 can include a number of pre-defined algorithms for VS (e.g., virtual sensors for variables associated with boilers, chillers, AHU's, RTU's, VAV systems, heat pumps, areas of a building, etc.)

The building automation algorithm selected by computing device 110 can be an FDD algorithm. For example, computing device 110 can select an FDD algorithm to be used for detection and diagnosis of faults in building automation system 108.

As used herein, a fault can include an event that occurs to cause a piece of equipment to function improperly or to cause abnormal behavior in a building, or an area of the building serviced by building automation system 108. In some examples, a fault can include a piece of equipment breaking down. In some examples, a fault can include a component of a piece of equipment ceasing to function correctly. In some examples, a fault can include abnormal behavior of a piece of equipment and/or an area.

Although a fault is described as including equipment breakdowns and abnormal behavior, embodiments of the disclosure are not so limited. For example, faults can include any other event that causes equipment to function improperly, and/or causes abnormal behavior to occur in a building serviced by building automation system 108.

As described above, the selected FDD algorithm can be specialized for a type of equipment included in building automation system 108. In some examples, the selected FDD algorithm can be specialized for a condensing boiler. In some examples, the selected FDD algorithm can be specialized for an AHU.

Although an FDD algorithm is described as being specialized for a condensing boiler or an AHU, embodiments of the disclosure are not so limited. For example, an FDD algorithm can be specialized for other types of equipment, including HVAC equipment, supporting HVAC equipment, equipment for lighting, shading, safety, security, etc.

The selected FDD algorithm can be specialized for specific characteristics of building automation system 108. For example, the selected FDD algorithm can be specialized for a building layout and/or layout of HVAC equipment (e.g., pipes for hot/chilled water supply/return, ductwork for supply/return/exhaust air, room orientation and/or area type, etc.)

Although an FDD algorithm is described as being specialized for a layout of pipes, ductwork, or room orientation, embodiments of the disclosure are not so limited. For example, an FDD algorithm can be specialized for other specific characteristics of a building automation system.

The selected FDD algorithm can be specialized for specific building data and/or building data properties. In some examples, the selected FDD algorithm can be specialized based on building data that can include required data points. In some examples, the selected FDD algorithm can be specialized based on building data properties that can include a specific sampling time of building data. In some examples, the selected FDD algorithm can be specialized based on building data properties that can include a specific data resolution of the building data.

Although an FDD algorithm is described as being specialized based on required data points, sampling time, and/or resolution, embodiments of the disclosure are not so limited. For example, an FDD algorithm can be specialized based on other specific building data and/or building data properties of a building automation system.

The building automation algorithm selected by computing device 110 can be a VS algorithm. For example, computing device 110 can select a VS algorithm to be used for measurement of data in building automation system 108.

As used herein, a virtual sensor refers to a sensor that can calculate an estimate of a measurement of a system variable from other known variables, measurements, and/or process parameters. For example, a virtual sensor can utilize information and/or data from physical sensors of building automation system 108 to determine information about building automation system 108. Methods such as k-Nearest Neighbors, local linear regression, polynomial regression, genetic polynomial regression, or artificial neural networks, can be used for calculating an estimation of the system variable, although embodiments of the disclosure are not so limited to the listed methods. For instance, a virtual sensor can determine information such as data associated with equipment of building automation system 108.

For instance, a virtual sensor can be set up to measure a boiler supply water mass flow by using boiler pump characteristics, water pipe characteristics, and power input to the pump, where the power input is measured by a meter. The boiler supply water mass flow may be measured utilizing a virtual sensor in the event that a physical sensor may be too expensive.

Each algorithm included in the pre-defined library of building automation algorithms 102 can include a self-description specification, a requirements specification, and a configuration specification. The self-description specification can describe each building automation algorithm, and can include different information based on whether the algorithm is an FDD algorithm or a VS algorithm. The requirements specification can describe requirements for use of each building automation algorithm. The configuration specification can include information regarding how each building automation algorithm is to be configured for use with building automation system 108.

The self-description specification of an FDD algorithm can include an equipment type, area of a building in which the FDD algorithm is applicable, types of detectable faults, types of affected variables, algorithm, reliability, and/or limitations, etc.

In some examples, an FDD algorithm for detecting boiler faults can include a self-description specification that describes the equipment type as a boiler; the type of detectable faults as a broken boiler, undersized boiler, and/or boiler controller fault; the types of affected variables as a supply water temperature of the boiler; and/or the algorithm as detecting a deviation of a supply water temperature from the set point of the supply water temperature, where the deviation is greater than a specified threshold.

In some examples, an FDD algorithm for detecting a stuck heating and/or cooling coil valve of an AHU can include a self-description specification that describes the equipment type as an AHU; the type of detectable faults as a stuck heating and/or cooling coil valve; the types of affected variables as a hot and/or chilled supply water mass flow; the algorithm as detecting a deviation of the supply air temperature measured by a sensor from the supply air temperature calculated by a virtual sensor that is greater than some threshold, where the virtual sensor can incorporate a valve position from a controller of the AHU; and/or limitations such as requiring a virtual sensor to be set up and trained.

Although the FDD algorithms described above include algorithms for detecting boiler faults and detecting a stuck valve of an AHU, embodiments of the disclosure are not so limited. For example, the pre-defined library of building automation algorithms 102 can include other types of pre-defined FDD algorithms usable for detecting faults in other equipment of building automation system 108.

The requirements specification of an FDD algorithm can include required variables, properties of variables, minimum amount of available historical data, assumed characteristics of equipment and/or areas of a building, and/or assumed causalities between variables of equipment, etc.

In some examples, an FDD algorithm for detecting boiler faults can include a requirements specification that describes the required variables as a supply water temperature of the boiler, a supply water temperature setpoint of the boiler, and an optional variable as power input to the boiler; properties of variables including a minimum data sampling time of fifteen minutes; a minimum amount of available historical data of zero; assumed characteristics of equipment including condensing and non-condensing boilers that operate based on gas or electricity; and assumed causalities between variables including a power input to the boiler as affecting the supply water temperature of the boiler.

In some examples, an FDD algorithm for detecting a stuck valve of an AHU can include a requirements specification that describes the required variables as a supply air temperature of the AHU; properties of variables including a minimum data sampling time of ten minutes; a minimum amount of available historical data of zero; assumed characteristics of equipment including an AHU with variable mixed air ratio, one heating coil and/or one cooling coil, supplied by one boiler and/or chiller; and assumed causalities between variables including a valve position of the AHU as affecting the mass flow of supply water to the AHU as affecting the supply air temperature of the AHU.

The configuration specification of an FDD algorithm can include a parametrization, code assembly, and/or training phases required to configure and adjust an FDD algorithm for use in building automation system 108, as will be further described in connection with FIG. 2.

The self-description specification of a VS algorithm can include a type of estimated measurement, an equipment type or area of a building in which the VS algorithm is applicable, algorithm used by the selected VS algorithm, suitability, limitations, etc.

In some examples, a VS algorithm for a supply water mass flow of a boiler can include a self-description specification that describes the type of estimated measurement as a supply water mass flow; equipment type as a boiler; and the algorithm used as k Nearest Neighbors.

In some examples, a VS algorithm for a supply air temperature of an AHU can include a self-description specification that describes the type of estimated measurement as a supply air temperature; equipment type as an AHU; the algorithm used as local linear regression; and/or limitations as configurable and useable only for either a heating mode or a cooling mode, as either one heating coil valve position or one cooling coil valve position can be incorporated into the calculation only.

Although the VS algorithms described above include algorithms for a supply water mass flow of a boiler and a supply air temperature of an AHU, embodiments of the disclosure are not so limited. For example, the pre-defined library of building automation algorithms 102 can include other types of pre-defined VS algorithms usable for setting up virtual sensors for other equipment and/or parts of building automation system 108.

The requirements specification of a VS algorithm can include required variables for use, properties of variables, minimum amount of available historical data, assumed characteristics of equipment or areas of the building, assumed causalities between variables, etc.

In some examples, a VS algorithm for a supply water mass flow of a boiler can include a requirements specification that describes the required variables for use as power input to a pump for the supply water for the boiler; properties of variables as including a minimum data sampling time of five minutes; a minimum amount of available historical data of 500 records; assumed characteristics of equipment as including condensing and non-condensing boilers that operate based on gas or electricity; and assumed causalities between variables as including a power input to the boiler pump as affecting the supply water mass flow of the boiler.

In some examples, a VS algorithm for a supply air temperature of an AHU can include a requirements specification that describes the required variables for use as a mixed air temperature of the AHU, hot or chilled supply water temperature of the AHU, and control signal for a heating or cooling coil valve position of the AHU from a controller of the AHU; properties of variables as including a minimum data sampling time of five minutes; a minimum amount of available historical data of 1000 records; assumed characteristics of equipment as including an AHU with a variable mixed air ratio, one heating coil and/or one cooling coil, supplied by one boiler and/or chiller; and assumed causalities between variables as including a heating or cooling coil valve position of the AHU as affecting the mass flow of hot or chilled supply water to the AHU, and mixed air temperature of the AHU, mass flow of hot or chilled supply water to the AHU, and hot or chilled supply water temperature of the AHU as all affecting the supply air temperature of the AHU.

The configuration specification of a VS algorithm can include a parametrization, code assembly, and/or training phases required to configure and adjust a VS algorithm for use in building automation system 108.

In some embodiments, the specifications (e.g., self-description, requirements, and configuration) of the algorithms included in the pre-defined library of building automation algorithms 102 can be defined and/or represented by various ontologies. As used herein, ontologies can refer to definitions of types, properties, and interrelationships of entities that exist for a particular domain. For example, the specifications (e.g., self-description, requirements, and configuration) of the algorithms included in the pre-defined library of building automation algorithms 102 can include various types (e.g., HVAC equipment, variables, air ducts, areas, FDD algorithms, fault types, VS algorithms), with various properties (e.g., identifier, name, size, manufacturer, properties of variables, amount of historical data), and interrelationships (e.g., layout of pipes/ductwork, required variables, causalities between variables) defined.

Although the specifications (e.g., self-description, requirements, and configuration) are described as being included in the pre-defined library of building automation algorithms 102, examples of the present disclosure are not so limited. For example, the specifications can be associated with building automation algorithms, but can be located external to the pre-defined library of building automation algorithms 102. For instance, the specifications can be internal to a computing resource separate from the pre-defined library of building automation algorithms 102, and in communication with computing device 110 (e.g., enabling computing device 110 to access the specifications over the Internet or another wired or wireless connection).

In some embodiments, the specifications (e.g., self-description, requirements, and configuration) of the algorithms included in the pre-defined library of building automation algorithms 102 can include (e.g., be formalized by) a semantic web language. For example, the specifications (e.g., self-description, requirements, and configuration) of the algorithms can include a semantic web language to express knowledge, axioms, constraints, and/or rules defined by the various ontologies included in the specifications (e.g., self-description, requirements, and configuration) of the algorithms.

Computing device 110 can determine whether the selected building automation algorithm matches a building information model 106 associated with the building automation system 108. For instance, computing device 110 can determine whether a selected building automation algorithm will be applicable to building automation system 108 by using information available in building information model 106. For example, computing device 110 can determine whether all of the information required to run the algorithm in building automation system 108 is available according to the building information model 106.

As used herein, a building information model can include building information modeling data associated with a building managed by building automation system 108. The building information modeling data can include characteristics, such as data associated with (e.g., quantities, properties, and/or statuses of) the components (e.g., control components), equipment, devices, networks (e.g., control networks), areas, and/or properties of the building. For example, the building information modeling data can include architectural, mechanical, electrical, plumbing, sanitary, fire, geometrical, and/or spatial (e.g., spatial relationship) information associated with the building.

For example, building information model 106 can include characteristics such as a floor plan (e.g., an architectural layout, such as an area, floor and/or room layout) of the building, available sensors, relationships between devices (e.g., energy flows, control network, etc.) and HVAC devices (e.g., HVAC equipment) in (e.g., located and/or used in) the building, among other types of building information modeling data. The HVAC devices in the building can include, for example, a chiller(s) (e.g., chiller plant), boiler(s) (e.g., boiler plant), pump(s), fan(s), air damper(s) such as a variable air volume (VAV) damper, air handling unit(s) (AHUs) (e.g., AHU plant), coil(s) such as a heating and/or cooling coil, air filter(s), heat pump(s), and/or cooling tower(s), among other HVAC devices.

In some embodiments, building information model 106 can include and/or be represented by various ontologies. As used herein, ontologies can refer to definitions of types, properties, and interrelationships of entities that exist for a particular domain. For instance, ontologies can refer to definitions of types, properties, and interrelationships of equipment and/or system variables in a building information model. For example, building information model 106 can include various types (e.g., HVAC equipment, air ducts, areas, walls, windows), with various properties (e.g., size, quantity, identifier, name, manufacturer, thermal resistance, etc.), and interrelationships (e.g., location, structure, energy flow, mass flow, signal flow, control flow, wiring) defined. In some embodiments, building information model 106 can include (e.g., be formalized by) a semantic web language. For example, building information model 106 can include the semantic web language to express knowledge, axioms, constraints, and/or rules defined by the various ontologies included in building information model 106.

Computing device 110 can determine whether the selected building automation algorithm matches building information model 106 associated with building automation system 108 by creating constraints for the selected building automation algorithm. Constraints for the selected building automation algorithm can be created using the self-description and requirements specifications of the selected algorithm.

In some examples, the selected building automation algorithm (e.g., an FDD algorithm) can include constraints such as an equipment type or area of a building in which the selected FDD algorithm is applicable, types of affected variables, possible limitations, required variables, properties of variables, minimum amount of available historical data, assumed characteristics of equipment or areas of a building, and/or assumed causalities between variables. In some examples, the selected building automation algorithm (e.g., a VS algorithm) can include constraints such as equipment type or area of a building in which the selected VS algorithm is applicable, possible limitations, required variables, properties of variables, minimum amount of available historical data, assumed characteristics of equipment or area of a building, and/or assumed causalities between variables.

Computing device 110 can determine whether the selected building automation algorithm matches building information model 106 associated with building automation system 108 by matching the constraints to the characteristics of building information model 106. As described above, characteristics of a building information model can include architectural layout, devices (e.g., HVAC devices), available sensors, relationships between devices, etc. For example, the constraints of the selected building automation algorithm and building information model 106 can be matched based on the circumstances of building automation system 108 as described by building information model 106.

The constraints for the selected building automation algorithm can be matched to the characteristics of building information model 106 by matching graph patterns of the constraints of the selected building automation algorithm to graph patterns of the characteristics of building information model 106. As used herein, graph pattern matching can include matching a pattern graph (e.g., constraints for the building automation algorithm created from the self-description and requirements specifications) to a target graph (e.g., characteristics of building information model 106). Nodes and edges in the graph pattern can define conditions that a subgraph of the target graph must satisfy in order to be a match. The pattern graph can include variables, blank nodes, keywords (e.g., UNION, OPTIONAL), constraints, regular expressions, wildcards, etc., that can describe whole sets of conditions and/or structures to be matched in the target graph.

Although constraints for the selected building automation algorithm are described as being matched to the characteristics of building information model 106 by graph pattern matching, embodiments of the present disclosure are not so limited. For example, constraints for the selected building automation algorithm can be matched to the characteristics of building information model 106 by other matching techniques (e.g., constraint matching, search algorithms, etc.), logical reasoning methods (e.g., description logic reasoning, rule-based reasoning, etc.), or the matching can be formulated and solved as constraint-satisfaction-problem (e.g., by applying heuristics and combinatorial search methods, backtracking, constraint propagation, local search, etc.)

In some embodiments, the constraints for the building automation algorithm can be formalized by a rule language (e.g., a semantic web rule language) or query language (e.g., SPARQL). The constraints can be executed on building information model 106 by a reasoner or query engine.

Computing device 110 can output, upon the selected building automation algorithm matching building information model 106, the selected algorithm. The selected building automation algorithm can be output to building automation system 108. In some examples, an FDD algorithm that matches building information model 106 can be output to building automation system 108 to be used for fault detection and diagnosis of equipment associated with building automation system 108. In some examples, a VS algorithm that matches building information model 106 can be output to building automation system 108 to be used for determining data (e.g., supply water mass flow, supply air temperature, etc.) associated with equipment (e.g., a boiler, an AHU, etc.) of building automation system 108.

Although the selected building automation algorithm is described as being output to building automation system 108, embodiments of the present disclosure are not so limited. For example, the selected building automation algorithm can be output to a different computing system or device, and/or to a user interface.

Although computing device 110 is described as outputting the selected algorithm upon a match, embodiments of the present disclosure are not so limited. For example, computing device 110 can output, upon the selected building automation algorithm matching building information model 106, variables to be used, equipment and/or area of the building in which the selected algorithm can be applied, etc.

Matching a building automation algorithm to a building automation system can allow a user and/or a system (e.g., a building automation system) to quickly set up fault detection and diagnosis systems, as well as virtual sensors for many different building automation systems. Fault detection and diagnosis algorithms can be specialized for different types of equipment and/or areas of a building, etc. and readily applied from a pre-defined library to different building automation systems. Further, virtual sensors can be set up to determine additional information about the building automation system without the need for costly additional physical sensors.

Figure 2:
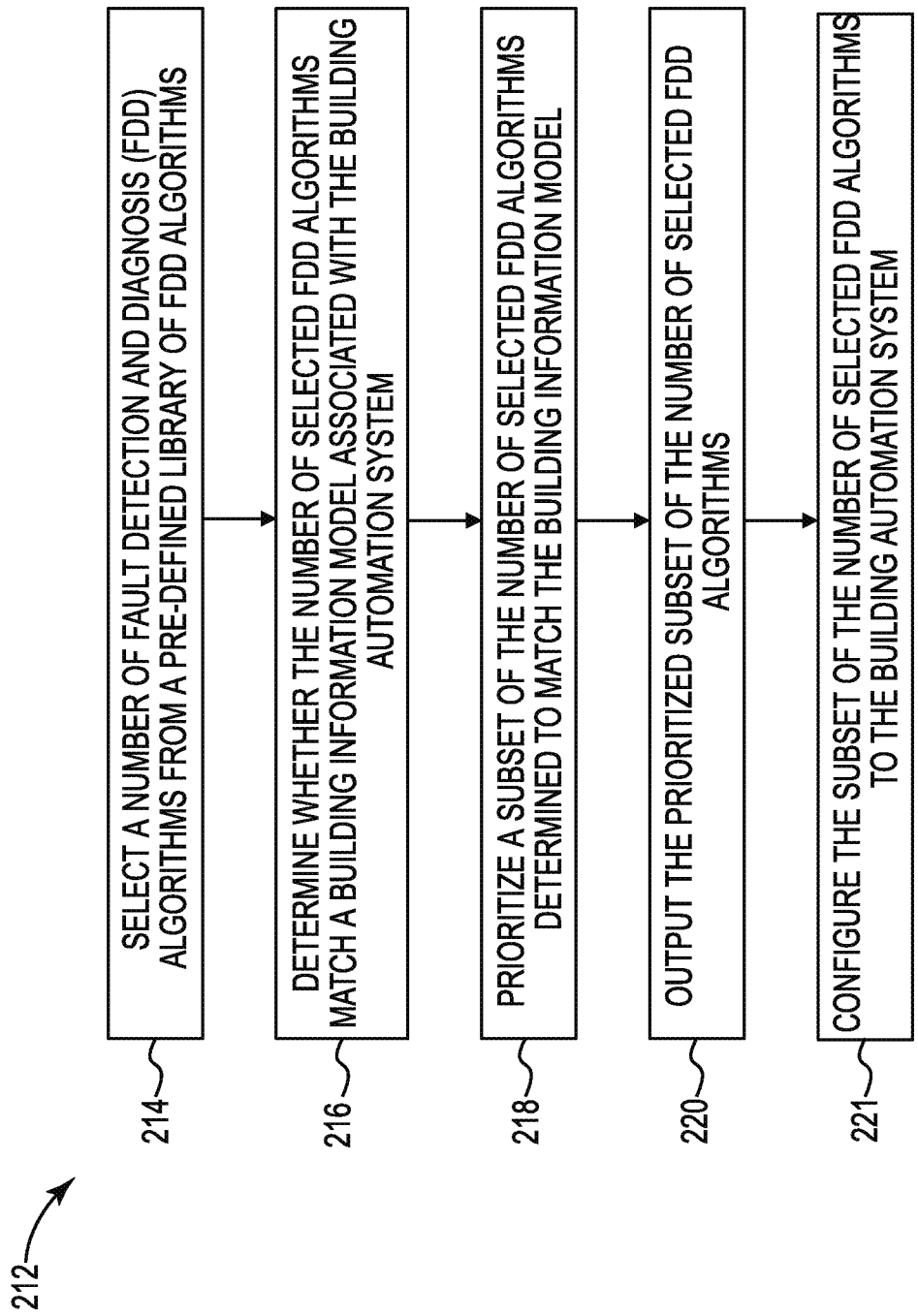
FIG. 2 is a flow chart of a method for matching a building automation algorithm to a building automation system, in accordance with one or more embodiments of the present disclosure.

FIG. 2 is a flow chart of a method for matching a building automation algorithm to a building automation system, in accordance with one or more embodiments of the present disclosure. Method 212 can be performed by, for example, computing device 110 and 410, described in connection with FIGS. 1, and 4, respectively.

At 214, the method 212 can include selecting a number of fault detection and diagnosis (FDD) algorithms from a pre-defined library of FDD algorithms.

Each of the FDD algorithms included in the pre-defined library of FDD algorithms can include a self-description specification, as previously described in connection with FIG. 1. For example, the FDD self-description specification can include an equipment type or area of a building in which the FDD algorithm is applicable, types of detectable faults by the FDD algorithm, types of affected variables of the building automation system, algorithm used by the selected FDD algorithm, reliability of the FDD algorithm, limitations of the FDD algorithm, etc.

Each of the FDD algorithms included in the pre-defined library of FDD algorithms can include a requirements specification, as previously described in connection with FIG. 1. For example, the FDD requirements specification can include required variables of the FDD algorithm, properties of the variables, minimum amount of available historical data, assumed characteristics of equipment and/or areas of a building, and/or assumed causalities between variables of the building automation system, etc.

The number of FDD algorithms from the pre-defined library can be selected based on pre-defined self-description specification requirements. For example, certain self-description specification requirements can be defined for selection of FDD algorithms based on the particular building automation system, such as the equipment type or area of the building, the algorithm used, etc. Based on the pre-defined self-description specification, certain FDD algorithms can be selected from the pre-defined library. For instance, a certain equipment type (e.g., a condensing boiler), types of detectable faults (e.g., a broken boiler), and/or types of affected variables (e.g., supply water temperature) may be defined for selection of FDD algorithms from the pre-defined library of FDD algorithms that include the predefined self-description specifications. The FDD algorithms can be selected based on the pre-defined self-description specifications by matching the pre-defined self-description requirements (e.g., as a query formalized by a query language such as SPARQL) with the self-description specification of the FDD algorithms in the pre-defined library.

Each of the FDD algorithms included in the pre-defined library of FDD algorithms can include a configuration specification. The configuration specification can include the parametrization, code assembly, and/or training phase that is required to configure and adjust a FDD for the building automation system, as will be further described herein.

At 216, the method 212 can include determining whether the number of selected FDD algorithms match a building information model associated with the building automation system. Determining whether the number of selected FDD algorithms match a building information model associated with the building automation system can include creating a number of constraints for each of the number of selected FDD algorithms and iteratively matching the number of constraints for each of the number of selected FDD algorithms to characteristics of the building information model.

For instance, a number of constraints for each of the number of selected FDD algorithms can be created (e.g., as previously described in connection with FIG. 1). Each of the selected FDD algorithms can be iteratively matched by matching the number of constraints for each of the number of selected FDD algorithms to the characteristics of the building information model. The selected FDD algorithms that include constraints that match the characteristics of the building information model can be saved for use in the building automation system, and the selected FDD algorithms that include constraints that do not match the characteristics of the building information model can be disregarded (e.g., not used). The matching can be done by graph pattern matching, as previously described in connection with FIG. 1.

At 218, the method 212 can include prioritizing a subset of the number of selected FDD algorithms determined to match the building information model. For example, of the number of selected FDD algorithms, the number that match the characteristics of the building information model can be saved as a subset. The subset can be prioritized using the self-description specification of each of the FDD algorithms that match the characteristics of the building information model. For example, the subset of FDD algorithms can be prioritized based on the equipment type or area of a building each FDD algorithm is applicable to, types of detectable faults of each FDD algorithm, types of affected variables of each FDD algorithm, the algorithm used by each FDD algorithm, the reliability of each FDD algorithm, and/or the limitations of each FDD algorithm.

At 220, the method 212 can include outputting the prioritized subset of the number of selected FDD algorithms. The prioritized subset of the number of selected FDD algorithms can be output to the building automation system for use in fault detection and diagnosis of equipment associated with the building automation system.

Although the prioritized subset of the number of FDD algorithms are described as being output to the building automation system, embodiments of the disclosure are not so limited. For example, the prioritized subset of the number of FDD algorithms can be output to a different computing system or device, and/or to a user interface.

At 221, the method 212 can include configuring the subset of the number of selected FDD algorithms to the building automation system. The subset of the number of selected FDD algorithms can be configured to the building automation system using the configuration specification included in each of the FDD algorithms. For example, a FDD algorithm for use in determining faults of a general boiler can be configured to determine faults of the boiler associated with the building automation system.

Figure 3:
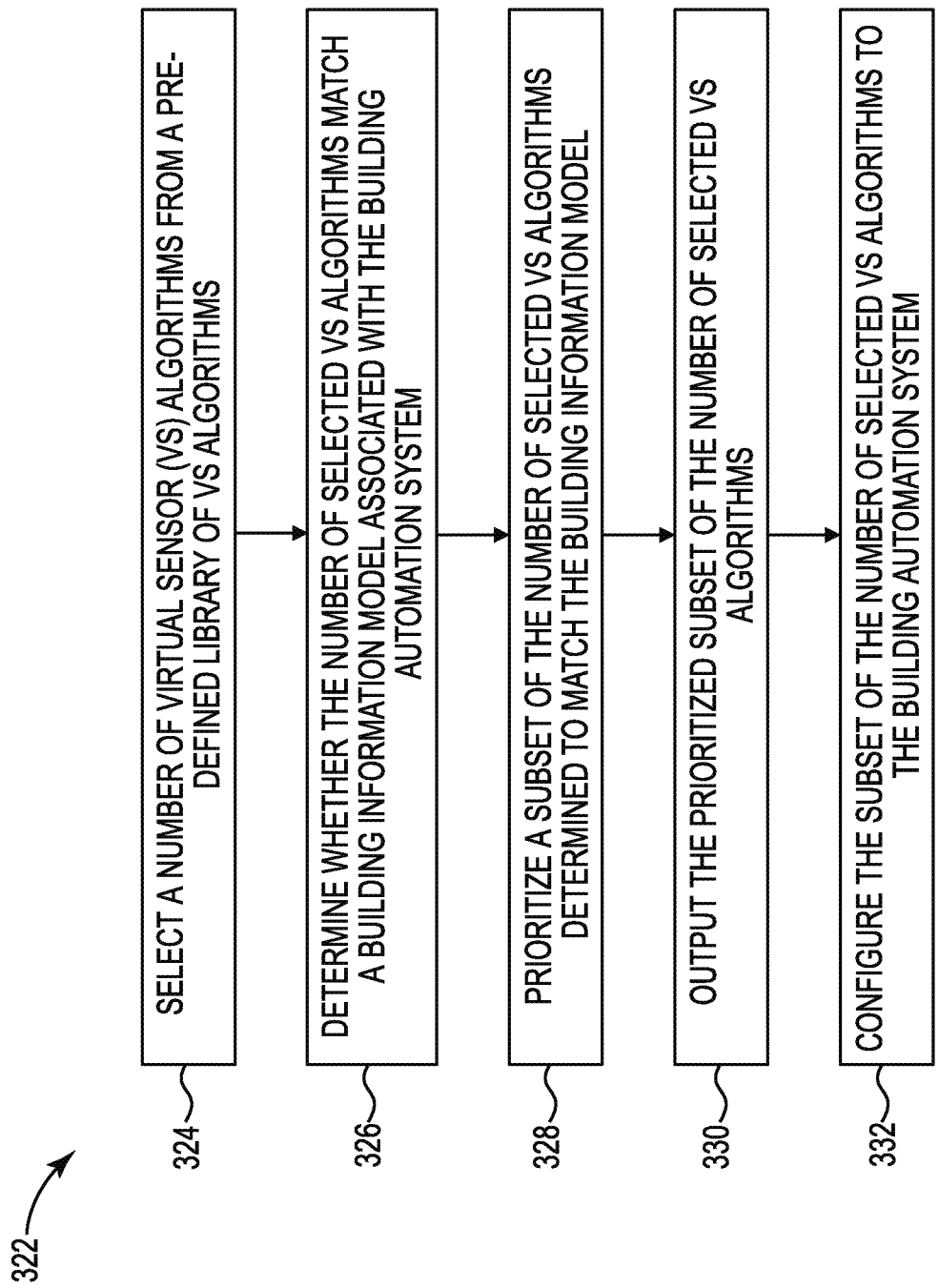
FIG. 3 is a flow chart of a method for matching a building automation algorithm to a building automation system, in accordance with one or more embodiments of the present disclosure.

FIG. 3 is a flow chart of a method for matching a building automation algorithm to a building automation system, in accordance with one or more embodiments of the present disclosure. Method 322 can be performed by, for example, computing device 110 and 410, described in connection with FIGS. 1, and 4, respectively.

At 324, the method 322 can include selecting a number of virtual sensor (VS) algorithms from a pre-defined library of VS algorithms.

Each of the VS algorithms included in the pre-defined library of VS algorithms can include a self-description specification, as previously described in connection with FIG. 1. For example, the VS self-description specification can include a type of estimated measurement, an equipment type or area of a building in which the VS algorithm is applicable, algorithm used by the selected VS algorithm, suitability of the VS algorithm, limitations of the VS algorithm, etc.

Each of the VS algorithms included in the pre-defined library of VS algorithms can include a requirements specification, as previously described in connection with FIG. 1. For example, the VS requirements specification can include required variables of the VS algorithm, properties of the variables, minimum amount of available historical data, assumed characteristics of equipment and/or area of the building, assumed causalities between variables of the building automation system, etc.

The number of VS algorithms from the pre-defined library can be selected based on pre-defined self-description specification requirements. For example, certain self-description specification requirements can be defined for selection of VS algorithms based on the particular building automation system, such as the equipment type or area of the building, the algorithm used, etc.

Based on the pre-defined self-description specification, certain VS algorithms can be selected from the pre-defined library. For instance, a certain type of estimated measurement (e.g., a supply air temperature), and/or equipment type (e.g., an AHU), may be defined for selection of VS algorithms from the pre-defined library of VS algorithms that include the predefined self-description specifications. The VS algorithms can be selected based on the pre-defined self-description specifications by matching the pre-defined self-description requirements (e.g., as a query formalized by a query language, such as SPARQL) with the self-description specification of the VS algorithms in the pre-defined library.

Each of the VS algorithms included in the pre-defined library of VS algorithms can include a configuration specification. The configuration specification can include the parametrization, code assembly, and/or training phase that is required to configure and adjust a VS for the building automation system, as will be further described herein.

At 326, the method 322 can include determining whether the number of selected VS algorithms match a building information model associated with the building automation system. Determining whether the number of selected VS algorithms match a building information model associated with the building automation system can include creating a number of constraints for each of the number of selected VS algorithms and iteratively matching the number of constraints for each of the number of selected VS algorithms to characteristics of the building information model.

For instance, a number of constraints for each of the number of selected VS algorithms can be created (e.g., as previously described in connection with FIG. 1). Each of the selected VS algorithms can be iteratively matched by matching the number of constraints for each of the number of selected VS algorithms to the characteristics of the building information model. The selected VS algorithms that include constraints that match the characteristics of the building information model can be saved for use in the building automation system, and the selected VS algorithms that include constraints that do not match the characteristics of the building information model can be disregarded (e.g., not used). The matching can be done by graph pattern matching, as previously described in connection with FIG. 1.

At 328, the method 322 can include prioritizing a subset of the number of selected VS algorithms determined to match the building information model. For example, of the number of selected VS algorithms, the number that match the characteristics of the building information model can be saved as a subset. The subset can be prioritized using the self-description specification of each of the VS algorithms that match the characteristics of the building information model. For example, the subset of VS algorithms can be prioritized based on the type of estimated measurement for each VS algorithm, an equipment type for each VS algorithm, the part of the building automation system, the algorithm used by each VS algorithm, the suitability of each VS algorithm, and/or the limitations of each VS algorithm.

At 330, the method 322 can include outputting the prioritized subset of the number of selected VS algorithms. The prioritized subset of the number of selected VS algorithms can be output to the building automation system for determining data associated with equipment of the building automation system.

Although the prioritized subset of the number of VS algorithms are described as being output to the building automation system, embodiments of the disclosure are not so limited. For example, the prioritized subset of the number of VS algorithms can be output to a different computing system or device, and/or to a user interface.

At 332, the method 322 can include configuring the subset of the number of selected VS algorithms to the building automation system. The subset of the number of selected VS algorithms can be configured to the building automation system using the configuration specification included in each of the VS algorithms. For example, a VS algorithm for use in determining supply water mass flow of a general boiler can be configured to determine supply water mass flow of the boiler associated with the building automation system.

Figure 4:
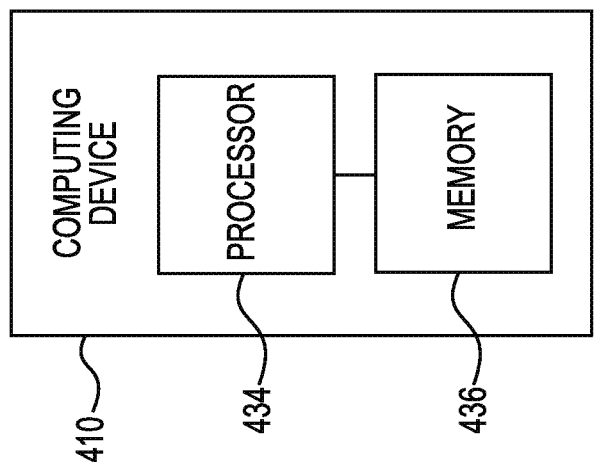
FIG. 4 is a schematic block diagram of a computing device for matching a building automation algorithm to a building automation system, in accordance with one or more embodiments of the present disclosure.

FIG. 4 is a schematic block diagram of a computing device for matching a building automation algorithm to a building automation system, in accordance with one or more embodiments of the present disclosure. As shown in FIG. 4, the computing device 410 can include a processor 434, and a memory 436.

The memory 436 can be any type of storage medium that can be accessed by the processor 434 to perform various examples of the present disclosure. For example, the memory 436 can be a non-transitory computer readable medium having computer readable instructions (e.g., computer program instructions) stored thereon that are executable by the processor 434 for matching a building automation algorithm to a building automation system in accordance with the present disclosure.

The memory 436 can be volatile or nonvolatile memory. The memory 436 can also be removable (e.g., portable) memory, or non-removable (e.g., internal) memory. For example, the memory 436 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 436 is illustrated as being located within computing device 410, embodiments of the present disclosure are not so limited. For example, memory 436 can also be located internal to another computing resource (e.g., enabling computer readable instructions to be downloaded over the Internet or another wired or wireless connection).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:
1. A computing device for matching a building automation algorithm to a building automation system, comprising:
a memory; and
a processor configured to execute executable instructions stored in the memory to:
select a number of building automation algorithms from a pre-defined library of building automation algorithms, wherein:
each of the building automation algorithms included in the pre-defined library of building automation algorithms include a self-description specification; and
the number of building automation algorithms are selected from the pre-defined library of building automation algorithms based on the self-description specifications of the number of building automation algo- rithms matching pre-defined self-description specification requirements of the building automation system;

determine whether the selected building automation algorithms match a building information model associated with the building automation system by:

creating constraints for the selected building automation algorithms, wherein the constraints are formalized by a semantic web language; and matching the constraints to characteristics of the building information model by matching graph patterns of the constraints for the selected building automation algorithms to graph patterns of the characteristics of the building information model;

prioritize a subset of the number of selected building automation algorithms determined to match the building information model, wherein the subset of the number of selected building automation algorithms are prioritized using the self-description specification; and output, upon the selected building automation algorithms match the building information model, the selected algorithms.

2. The computing device of claim 1, wherein the selected building automation algorithms include fault detection and diagnosis (FDD) algorithms.

3. The computing device of claim 1, wherein the selected building automation algorithms include virtual sensor (VS) algorithms.

4. The computing device of claim 1, wherein each algorithm included in the pre-defined library of building automation algorithms include a requirements specification.

5. The computing device of claim 1, wherein the constraints for the selected building automation algorithms are created using a self-description and requirements of the selected algorithms.

6. The computing device of claim 1, wherein the selected algorithms are output to the building automation system.

7. A computer implemented method for matching an algorithm to a building automation system, comprising:

selecting a number of fault detection and diagnosis (FDD) algorithms from a pre-defined library of FDD algorithms, wherein:

each of the FDD algorithms included in the pre-defined library of FDD algorithms include a self-description specification; and the number of FDD algorithms are selected from the pre-defined library of FDD algorithms based on the self-description specifications of the number of FDD algorithms matching pre-defined self-description specification requirements of the building automation system;

determining whether the number of selected FDD algorithms match a building information model associated with the building automation system by:

creating a number of constraints for each of the number of selected FDD algorithms, wherein the constraints are formalized by a semantic web language; and iteratively matching the number of constraints for each of the number of selected FDD algorithms to characteristics of the building information model by matching graph patterns of the constraints for the number of selected FDD algorithms to graph patterns of the characteristics of the building information model;

prioritizing a subset of the number of selected FDD algorithms determined to match the building information model, wherein the subset of the number of selected FDD algorithms are prioritized using the self-description specification;

outputting the prioritized subset of the number selected FDD algorithms; and configuring the subset of the number of selected FDD algorithms to the building automation system.

8. The method of claim 7, wherein each of the FDD algorithms included in the pre-defined library of FDD algorithms include a configuration specification.

9. The method of claim 8, where the method includes configuring the subset of the number of selected FDD algorithms using the configuration specification.

10. The method of claim 7, wherein each of the FDD algorithms included in the pre-defined library of FDD algorithms include a requirements specification.

11. A non-transitory computer readable medium having computer readable instructions stored thereon that are executable by a processor to:

select a number of virtual sensor (VS) algorithms from a pre-defined library of VS algorithms, wherein:

each of the VS algorithms included in the pre-defined library of VS algorithms include a self-description specification; and the number of VS algorithms are selected from the pre-defined library of VS algorithms based on the self-description specifications of the number of VS algorithms matching pre-defined self-description specification requirements of the building automation system;

determine whether the number of selected VS algorithms match a building information model associated with a building automation system by:

creating a number of constraints for each of the number of selected VS algorithms, wherein the constraints are formalized by a semantic web language; and iteratively matching the number of constraints for each of the number of selected VS algorithms to characteristics of the building information model by matching graph patterns of the constraints for the number of selected VS algorithms to graph patterns of the characteristics of the building information model;

prioritize a subset of the number of selected VS algorithms determined to match the building information model, wherein the subset of the number of selected VS algorithms are prioritized using the self-description specification;

output the prioritized subset of the number of selected VS algorithms; and configure the subset of the number of selected VS algorithms to the building automation system.

12. The computer readable medium of claim 11, wherein:

each of the VS algorithms included in the pre-defined library of VS algorithms include a configuration specification; and wherein the computer readable instructions are executable by a processor to configure the subset of the number of selected VS algorithms using the configuration specification.

13. The computer readable medium of claim 11, wherein the prioritized subset of the number of selected VS algorithms are output to the building automation system.

14. The computer readable medium of claim 11, wherein each of the VS algorithms included in the pre-defined library of VS algorithms include a requirements specification.

* * * * *